(No Model.)
F. F. SCHOFIELD.
DRIVE CHAIN.
No. 377,120. Patented Jan. 31, 1888.
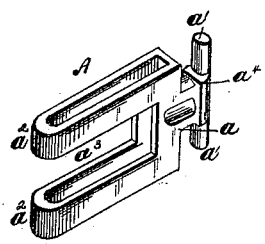
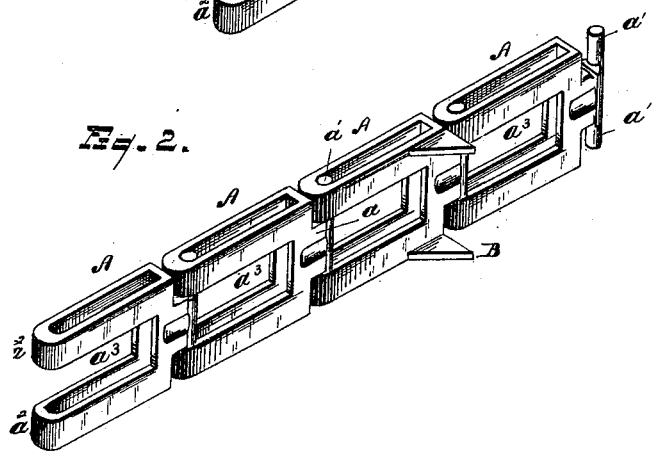
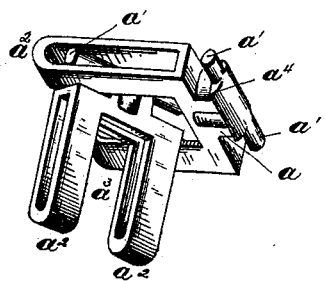
WITNESSES
Samuel E. Thomas
N. S. Wright
INVENTOR
Fredrick F. Schofield
By W. W. Leggett.
Attorney

UNITED STATES PATENT OFFICE.

FREDRICK F. SCHOFIELD, OF OSCODA, MICHIGAN.

DRIVE-CHAIN.

SPECIFICATION forming part of Letters Patent No. 377,120, dated January 31, 1888.

Application filed July 7, 1887. Serial No. 243,659. (No model.)

*To all whom it may concern:*

Be it known that I, FREDRICK F. SCHOFIELD, of Oscoda, county of Iosco, State of Michigan, have invented a new and useful Improvement in Chains; and I declare the following to be a full, clear, and exact description of the same, such as will enable others skilled in the art to which it pertains to make and use it, reference being had to the accompanying drawings, which form a part of this specification.

My invention consists more particularly in the devices and appliances hereinafter specified, and pointed out in the claims.

In the drawings, Figure 1 is a view of a separate link. Fig. 2 is a view of the chain. Fig. 3 illustrates how the links are engaged with each other or disengaged.

It is the purpose of this invention to produce a chain in which the links may be readily detached from each other, yet of such construction that accidental separation of the chain is effectually prevented, the said construction also admitting of ready removal or insertion of the link.

In carrying out my invention, A represents one of the links of my improved chain. It consists of a shank, $a$, provided with a cross-piece terminating in trunnions $a'$, the body of the link being in the form of two closed loops, $a^2$, with an opening, $a^3$, between them. Between the trunnions $a'$ are outstanding projections $a^4$, which come up between the loops $a^2$. These projections serve several purposes. They prevent the wear which would otherwise arise upon the shank $a$ by reason of the impingement against the shank of the loops $a^2$. They also protect the loops $a^2$ more or less from wear as they pass over a pulley or sprocket-wheel. They also serve to thoroughly brace the sides of the loops, holding them snugly in place, and prevent them from being crushed together against the shank and distribute the wear upon the loops, whereas if the shoulders were not there the wear upon the loops would take place at the points where their edges strike against the shank. These links may be engaged and disengaged, as shown in Fig. 3. To this end one of the links is turned at right angles, so as to introduce its trunnions into the slot $a^3$ between the loops $a^2$. It is then turned half-way round, so as to bring the trunnions into the loops, and the trunnions are then brought forward into the ends of the loops, which completes the engagement of the links.

It is apparent that when the links are in line in the chain it is impossible to disengage any link from its adjacent link, and that this can only be accomplished by bringing one link up at right angles with the adjacent link, then turning one of the links in such manner as to bring the trunnions both into the slot $a^3$. This chain may be used for any of the purposes for which detachable link chains are employed—as, for instance, for ordinary belting, drag-chains, and the like.

In Fig. 2 one of the links is represented as provided with spurs or shoulders B, whereby it is adapted as a drag-chain or conveyer-chain. Links of this character may be located in the usual way at desired intervals.

It will be understood that the projections B may be of any form, dependent upon the purpose for which they are to be employed.

What I claim is—

1. A link for a detachable link chain, the same consisting of shank $a$, with trunnions $a'$ and loops $a^2$, with an intermediate slot, $a^3$, substantially as described.

2. A link for a detachable link chain, consisting of shank $a$, with trunnions $a'$, loops $a^2$, with intermediate slot, $a^3$, and in connection therewith lugs or shoulders $a^4$, substantially as described.

3. A link for a detachable link chain, the same consisting of a shank, $a$, with trunnions $a'$, loops $a^2$, with intermediate slot, $a^3$, and projections B, substantially as and for the purposes described.

4. A detachable link chain, the same consisting of a series of links engaged with each other, each said link consisting of a shank, $a$, with trunnions $a'$, and loops $a^2$, with an intermediate slot, $a^3$, and with or without the lugs or shoulders $a^4$, substantially as and for the purposes described.

In testimony whereof I sign this specification in the presence of two witnesses.

FREDRICK F. SCHOFIELD.

Witnesses:
A. V. LOOMIS,
A. STEPHENS.